(12) United States Patent
Sway-Tin et al.

(10) Patent No.: US 6,364,434 B1
(45) Date of Patent: Apr. 2, 2002

(54) INTELLIGENT COAST-DOWN ALGORITHM FOR ELECTRIC VEHICLE

(75) Inventors: Min Sway-Tin, Troy; Mark R. Arcori, Rochester Hills; Kert L. Cartwright, Romeo; Thaddeus Roterman, Shelby Township, all of MI (US); James R. McCoy, Elkridge, MD (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/283,886

(22) Filed: Apr. 1, 1999

(51) Int. Cl.$^7$ ................................................. B60T 8/64
(52) U.S. Cl. ...................................... 303/152; 303/152
(58) Field of Search ................................. 303/152, 151

(56) References Cited

U.S. PATENT DOCUMENTS

| | | | |
|---|---|---|---|
| 4,270,806 A | * | 6/1981 | Venkataperumal et al. .... 303/3 |
| 5,383,719 A | * | 1/1995 | Farr ........................ 303/113.2 |
| 5,578,911 A | | 11/1996 | Carter et al. |
| 5,615,933 A | * | 4/1997 | Kidston et al. ............. 303/152 |
| 5,637,987 A | * | 6/1997 | Fattic .......................... 322/40 |
| 5,713,425 A | * | 2/1998 | Buschhaus et al. ........ 180/65.2 |
| 5,713,428 A | * | 2/1998 | Linden et al. .............. 180/179 |
| 5,722,500 A | * | 3/1998 | Toukura et al. ............... 477/40 |
| 6,076,899 A | * | 6/2000 | Isella ......................... 303/152 |

\* cited by examiner

Primary Examiner—Robert J. Oberleitner
Assistant Examiner—Robert A. Siconolfi
(74) Attorney, Agent, or Firm—Mark P Calcaterra

(57) ABSTRACT

A method and apparatus are provided for applying a coast-down braking torque to a vehicle coasting. The system provides a controlled regenerative braking torque automatically applied when the vehicle is coasting to simulate the feeling of a vehicle having an internal combustion engine. When the driver lets off the throttle when a vehicle is either on a flat grade or driving down a hill, the amount of regenerative braking is automatically controlled. When utilized with an electric or hybrid electric vehicle, the coast-down braking torque is converted to stored electric energy which improves the efficiency of the vehicle.

2 Claims, 4 Drawing Sheets

INTELLIGENT COAST-DOWN ALGORITHM FOR ELECTRIC VEHICLE

BACKGROUND OF THE INVENTION

FIELD OF THE INVENTION

The present invention relates generally to electric vehicles and hybrid electric vehicles that make use of regenerative braking. In particular, the present invention relates to controlling a mild regenerative braking torque applied when the vehicle is coasting to simulate the feeling of a vehicle having an internal combustion engine when the driver has let off the throttle when the vehicle is either on a flat grade or the vehicle is driving down a hill.

BACKGROUND AND SUMMARY OF THE INVENTION

Conventional automobiles which are driven by an internal combustion engine provide an engine braking effect when the vehicle is coasting. In particular, when the driver of a conventional vehicle has let off the throttle while the vehicle is either on a flat grade or driving down a hill, the internal combustion engine tends to apply a braking force (often called engine braking) through the transmission to the traction wheels of the vehicle. In particular, the braking force applied by the engine is due to the fact that the engine slows down when the accelerator pedal is released so that the engine output shaft applies a resistance torque to the transmission which is therefore transmitted to the drive wheels. The majority of the driving public has become accustomed to the feel of a vehicle which has engine braking during coast-down.

Accordingly, it is desirable in the development of electric and hybrid electric vehicles to provide a similar feel to the driver when the driver lets off the throttle when the vehicle is either on a flat grade or driving down a hill in order to increase the acceptance of these vehicles. Specifically, the present invention is directed toward providing a mild regenerative braking torque when the vehicle is coasting to simulate the feeling of the internal combustion vehicle. The objective of the present invention is to control or maintain the vehicle speed when coasting down a hill by monitoring the vehicle speed and varying the coast-down regen torque being applied.

The present invention solves the problem of adding a "low" position on the PRNDL display where a single speed gear box for an electric vehicle does not have a lower gear. The present invention has the advantage of letting the driver be able to drive as normal down a long steep hill by letting the foot off the throttle to adjust the vehicle speed. Otherwise, the driver has to shift the gear selector to a low position (if available) or use the brakes, which end up losing the usable energy as friction heat. The present invention also has the advantage of prolonging the life of the friction brake system while extending the driving range of electric vehicles and hybrid electric vehicles by converting the braking energy into stored electric energy.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
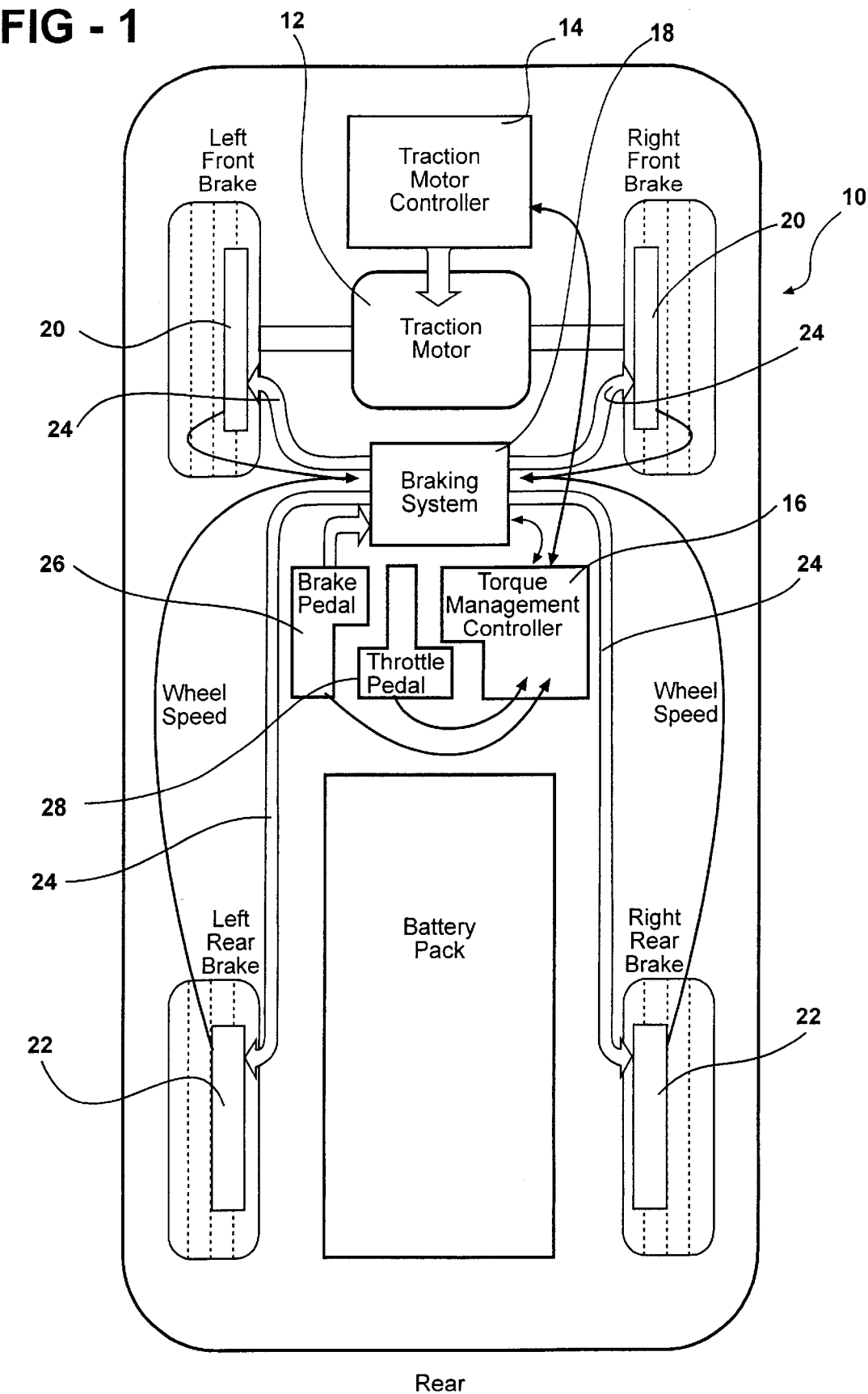
FIG. 1 is a schematic view of the vehicle coast-down braking system according to the principles of the present invention.

With reference to FIGS. 1–4, the vehicle coast-down braking system and intelligent coast-down algorithm, according to the principles of the present invention, will now be described. With particular reference to FIG. 1, a motor vehicle 10 is shown provided with the vehicle coast-down braking system according to the principles of the present invention. The vehicle coast-down braking system includes a traction motor 12 which is controlled by a traction motor controller 14. A torque management controller 16 is provided for controlling the traction motor controller 14 and a braking system 18. The braking system 18 provides hydraulic fluid to pairs of front and rear brakes 20, 22, respectively via hydraulic lines 24. A brake pedal 26 is provided for controlling the braking system 18. A throttle pedal 28 is provided for operatively controlling the vehicle speed. The brake pedal 26 and throttle pedal 28 are provided with position sensors which provide signals to the torque management controller 16 for controlling the traction motor 12.

Figure 2:
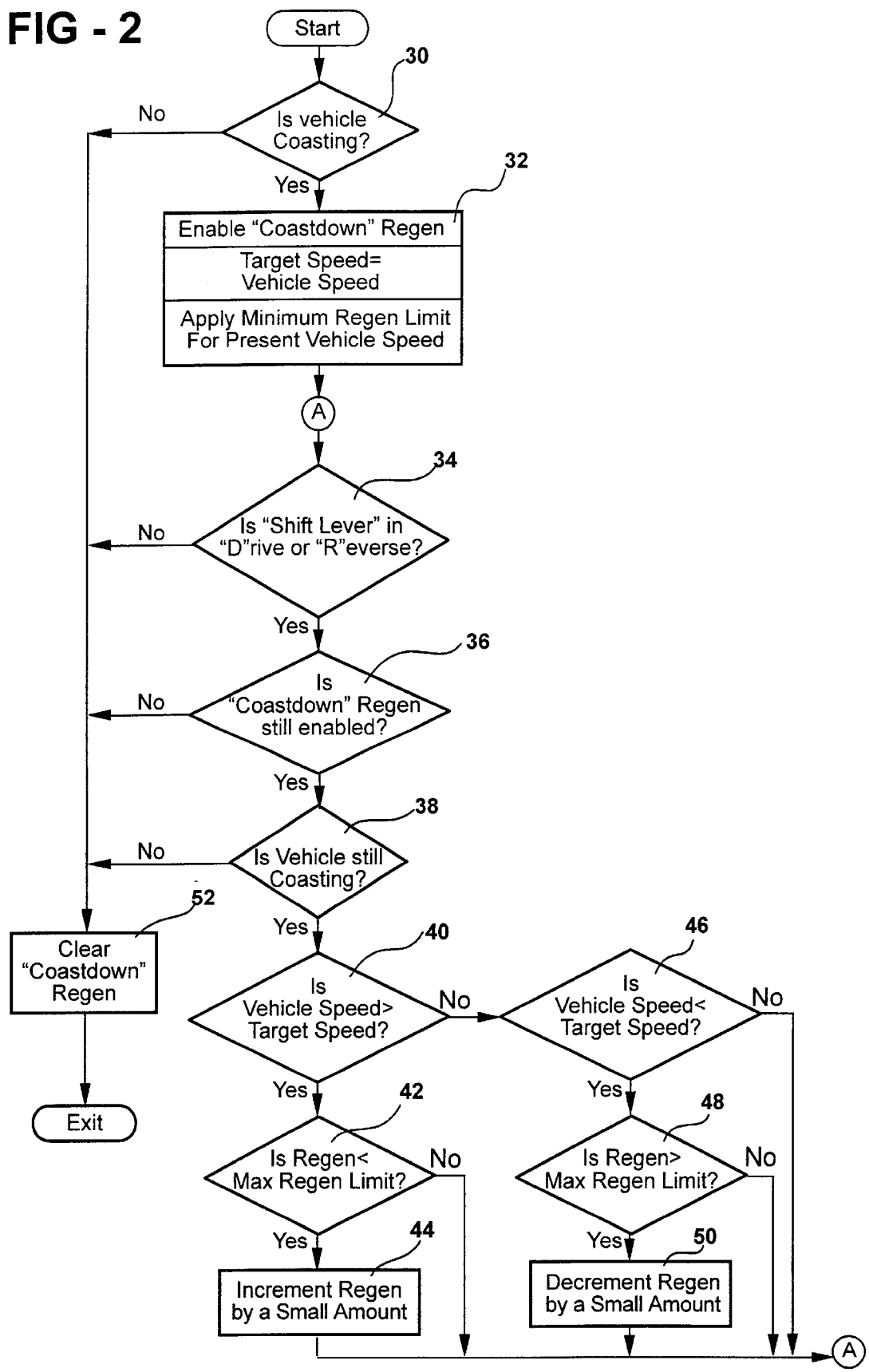
FIG. 2 is a block diagram of the intelligent coast-down algorithm for electric and non-electric powertrain vehicles according to the principles of the present invention.

With reference to FIG. 2, the intelligent coast-down algorithm according to the principles of the present invention will now be described in connection with the exemplary vehicle coast-down braking system shown in FIG. 1. As shown in FIG. 2, the torque management controller 16 initially determines whether the vehicle is coasting at step 30. A coasting condition is determined as being present when the driver is not depressing on the throttle pedal 28 or the brake pedal 26 while the vehicle is in motion. If it is determined at step 30 that the vehicle is coasting, the torque management controller 16 enables "coast-down" regen, sets a target speed equal to the current vehicle speed and applies a minimum regen limit for present vehicle speed, according to the graph shown in FIG. 3 based upon the vehicle speed at step 32.

Next, it is determined whether the shift lever is in the "D"rive or "R"everse position at step 34, and if so, it is determined whether the "coast-down" regen is still enabled at step 36. It should be noted that at step 36, "coast-down" regen can be disabled by external conditions such as a driver's override switch, input from a chassis control module, or the ABS/brake control module. If the coast-down regen is still enabled at step 36, it is determined whether the vehicle is still coasting at step 38. If the vehicle is still coasting at step 38, it is determined whether the vehicle speed is greater than the target speed at step 40. If the vehicle speed exceeds the target speed at step 40, then the torque management controller 16 determines if the regen amount is less than the maximum regen limit according to FIG. 3, at step 42. If the regen amount is less than the maximum regen limit, the regen amount is incremented by a small amount at step 44. If the regen amount is not determined to be less than the maximum regen limit at step 42, the control returns to step 34.

If at step 40 the vehicle speed is not determined to be greater than the target speed, control proceeds to step 46 where it is determined whether the vehicle speed is less than the target speed. If the vehicle speed is determined to be less than the target speed, the torque management controller 16 proceeds to step 48 and determines if the regen amount is greater than the minimum regen limit at step 48. If the regen amount is greater than the minimum regen limit at step 48, the regen amount is decremented a small amount at step 50 and control returns to step 34.

If at step 46 the vehicle speed is not determined to be less than the target speed, the control returns to step 34. If in step 30 it is not determined that the vehicle is coasting, then the control continues to step 52 wherein the coast-down regen command is cleared. Likewise, in step 34, if it is determined that the shift lever is not in the "D"rive or "R"everse position, control proceeds to step 52. In step 36, if the coast-down regen is not enabled, the control continues to step 52, as well as if the vehicle is determined to be no longer coasting in step 38, then control proceeds to step 52.

The braking torque that is applied according to the present invention is preferably energy recoverable regenerative braking such as by a motor/generator but can also include non-energy recoverable braking namely friction brakes. The present invention is also applicable for internal combustion engine vehicles having an electronic transmission, and/or ABS control to absorb the kinetic energy from the vehicle. With the system of the present invention utilized for controlling an ABS system for applying friction braking, the torque management controller 16 provides signals to the braking system 18 for applying hydraulic pressure to the front and rear brakes 20, 22.

Having a software and electronically controlled torque output of the traction motor, the vehicle is able to accelerate or decelerate electronically. Therefore, under the software control, the electronic traction motor controller can apply a proper amount of negative torque required for the vehicle to decelerate or to maintain its cruising speed whether the vehicle is on a flat surface or going down a steep hill. This is done automatically, and the driver does not have to step on a brake or shift the gear selector from drive to a low position.

The system of the present invention provides an electric or hybrid electric vehicle with the feel of an internal combustion engine while also converting the braking force applied during a coast-down to stored electric energy which can be reused for driving the vehicle. Thus, the intelligent coast-down algorithm of the present invention provides a system for increasing fuel economy and improving driver feel.

Figure 4:
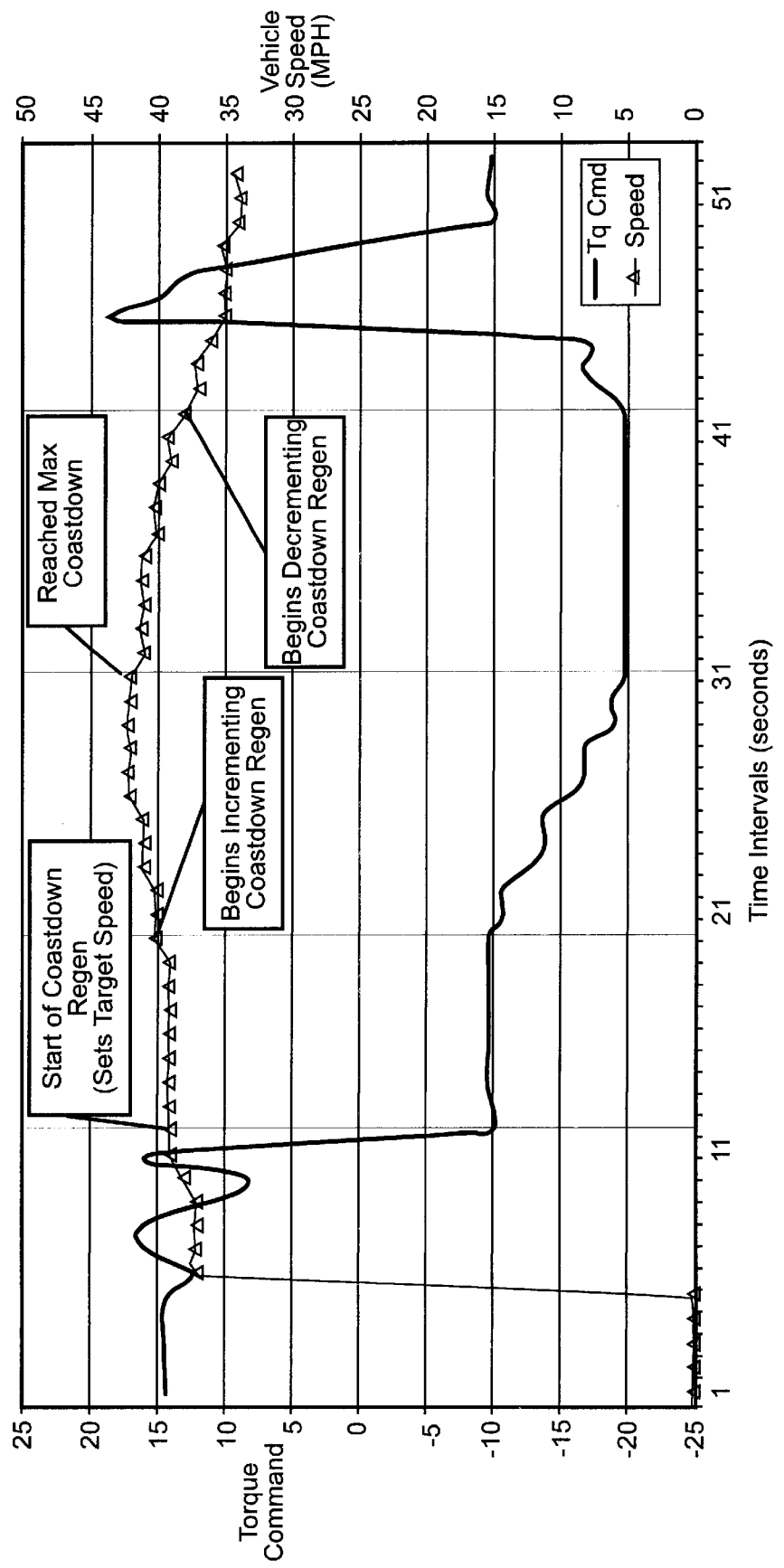
FIG. 4 illustrates example test data obtained from applying the principles of the present invention to a test vehicle having the vehicle coast-down braking system according to the principles of the present invention.

With reference to FIG. 4, the vehicle speed and torque command of a test vehicle during coast-down will be described. With reference to FIG. 4, the torque command is provided along the left-hand side of the graph while the vehicle speed is displayed along the right-hand side of the graph. The torque command is illustrated by a solid line, while the vehicle speed is illustrated by the triangular point data line.

The torque command and vehicle speed are illustrated over time wherein at approximately the five (5) second time, the vehicle speed increases from zero. At approximately, the ten (10) second mark, the torque command greatly decreases (indicative of the accelerator pedal being released) and subsequently, the coast-down algorithm is started at approximately the twelve (12) second mark, wherein the target speed is set to approximately 39 mph and a negative torque command is then provided and the vehicle speed remains generally constant until approximately the twenty (20) second mark at which the speed begins to increase and the control system begins incrementing the coastdown regen command. At approximately thirty-one (31) seconds, the maximum coast-down regen limit is reached, and the torque command is maintained at that level until approximately the forty-two (42) second mark. At the forty-two (42) second mark, the vehicle speed has decreased to the set target speed of approximately 39 miles per hour, and as the vehicle speed continues to decrease below the target speed of 39 miles per hour, the torque command is decremented repeatedly until the torque command suddenly spikes upward indicative of the driver pressing the accelerator pedal at approximately the forty-five (45) second mark.

Figure 3:
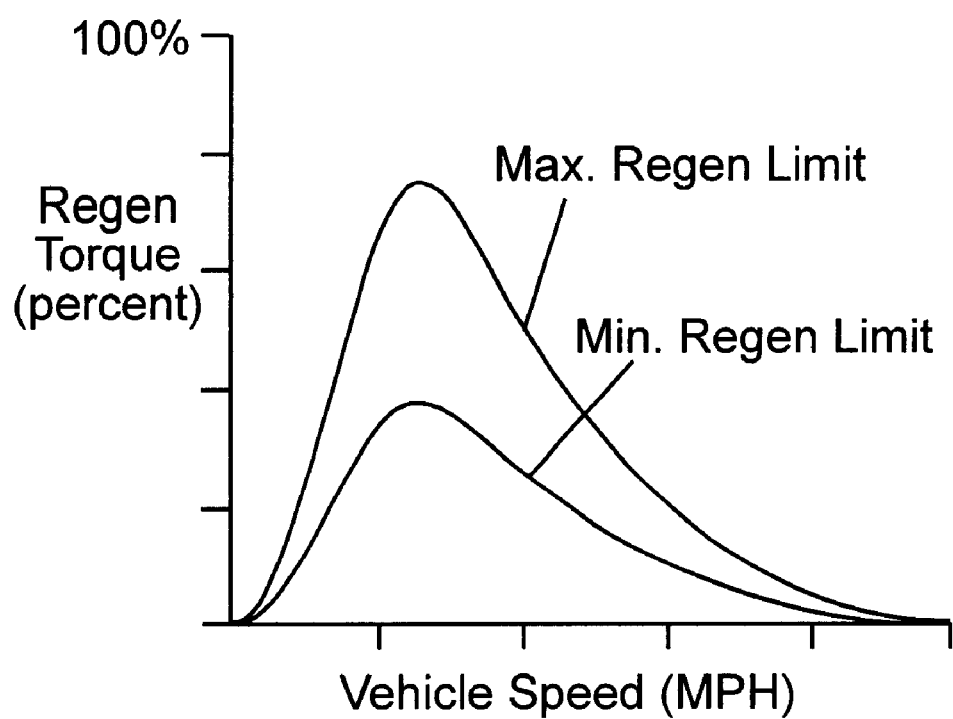
FIG. 3 is an exemplary graph of the minimum and maximum regenerative torque limits used in association with the intelligent coast-down algorithm according to the principles of the present invention.

As would be understood by one of ordinary skill in the art, the maximum and minimum regen torque limit illustrated in FIG. 3 can be varied in order to provide a different driving feel. Accordingly, the maximum and minimum regen limit control map can be altered in order to adjust the driving and feel of the vehicle.

The system of the present invention controls or maintains the vehicle speed when coasting down a hill by monitoring the vehicle speed and varying the coast-down braking torque and for applications with electric and hybrid electric vehicles can convert the coast-down braking torque into a regenerative torque which converts the braking force into stored electric energy. When used with a vehicle having an internal combustion engine or other vehicle without regenerative braking capabilities, the coast-down braking torque can be applied by an electronically controlled braking system to absorb the kinetic energy from the vehicle while giving the feel of engine braking.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of applying a braking torque to a vehicle when coasting, comprising the steps of:

determining if a vehicle is coasting indicated by both a throttle and a brake pedal being released;

applying a predetermined amount of coast braking torque to said vehicle responsive to a determination that the vehicle is coasting;

setting a target speed equal to the vehicle speed at approximately the time that it is determined that the vehicle is coasting; and detecting a vehicle speed after said target speed is set and comparing said vehicle speed to said target speed and if said vehicle speed is greater than said target speed then incrementing said coast braking torque by a predetermined amount;

wherein the coast braking torque is compared to a maximum coast braking torque limit and if the coast braking torque is not less than the maximum coast braking torque limit, then the step of incrementing the coast braking torque is bypassed.

2. A method of applying a braking torque to a vehicle when coasting, comprising the steps of:

determining if a vehicle is coasting indicated by both a throttle and a brake pedal being released;

applying a predetermined amount of coast braking torque to said vehicle responsive to a determination that the vehicle is coasting;

setting a target speed equal to the vehicle speed at approximately the time that it is determined that the vehicle is coasting; and detecting a vehicle speed after said target speed is set and comparing said vehicle speed to said target speed and if said vehicle speed is less than said target speed then decrementing said coast braking torque by a predetermined amount; and wherein the coast braking torque is compared to a minimum coast braking torque limit and if the coast braking torque is not greater than the minimum coast braking torque limit, then the step of decrementing the coast braking torque is bypassed.

* * * * *